United States Patent
Walker et al.

(10) Patent No.: US 8,909,914 B2
(45) Date of Patent: Dec. 9, 2014

(54) CONTROLLER AND A METHOD FOR CONTROLLING A BOOT PROCESS

(75) Inventors: Debbie A. Walker, Tucson, AZ (US); Marcus A. Evans, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 478 days.

(21) Appl. No.: 13/212,857

(22) Filed: Aug. 18, 2011

(65) Prior Publication Data

US 2012/0054481 A1    Mar. 1, 2012

Related U.S. Application Data

(60) Provisional application No. 61/377,782, filed on Aug. 27, 2010.

(51) Int. Cl.
*G06F 15/177* (2006.01)
*G06F 9/44* (2006.01)

(52) U.S. Cl.
CPC .................................. *G06F 9/4401* (2013.01)
USPC .......................................................... 713/2

(58) Field of Classification Search
USPC ...................................................... 713/12, 2
See application file for complete search history.

(56) References Cited

U.S. PATENT DOCUMENTS

| | | | |
|---|---|---|---|
| 6,754,818 B1 * | 6/2004 | Lee et al. | 713/2 |
| 7,694,122 B2 * | 4/2010 | Lee | 713/2 |
| 7,836,293 B1 * | 11/2010 | Wynia | 713/2 |
| 2003/0233534 A1 | 12/2003 | Bernhard et al. | |
| 2005/0166010 A1 | 7/2005 | Martin | |
| 2006/0271778 A1 * | 11/2006 | Lee | 713/2 |
| 2010/0146256 A1 | 6/2010 | Luo et al. | |

FOREIGN PATENT DOCUMENTS

| | | |
|---|---|---|
| WO | WO-2012/027202 A4 | 3/2012 |
| WO | WO-2012027202 A1 | 3/2012 |

OTHER PUBLICATIONS

"International Application Serial No. PCT/US2011/048291, International Preliminary Report on Patentability mailed Mar. 14, 2013", 5 pgs.
"International Application Serial No. PCT/US2011/48291, Search Report mailed Jan. 6, 2012", 2 pgs.
"International Application Serial No. PCT/US2011/48291, Written Opinion mailed Jan. 6, 2012", 4 pgs.

\* cited by examiner

*Primary Examiner* — Paul Yanchus, III
*Assistant Examiner* — Eric Chang
(74) *Attorney, Agent, or Firm* — Schwegman Lundberg & Woessner, P.A.

(57) ABSTRACT

A computer, a computer system and a method of booting the computer and computer systems within 300 milliseconds of receiving power. The computer may be configured to simultaneously power sequence a controller, a processor and a chipset. The computer may be further configured to transfer a boot image from a non-volatile memory to a first volatile memory. The controller may be further configured to transfer the boot image from the first volatile memory to a volatile memory associated with the processor using a PCI-Express interface.

15 Claims, 6 Drawing Sheets

| RTC FREQUENCY = 100 KHz | | | RTC FREQUENCY = 32.768 KHz | |
|---|---|---|---|---|
| VDD3_3A | | | | |
| VDD5_0A | | | | |
| VCCRTC | WAIT | VDD1_8U | VDD5_0S, VDD3_3S, VDD1_5S AND VDD1_05S | VCORE |
| | ←—34 mS—→ | | | |
| ←———————————————88 mS———————————————→ | | | | |

FIG. 6

CONTROLLER AND A METHOD FOR CONTROLLING A BOOT PROCESS

CLAIM OF PRIORITY

This patent application claims the benefit of priority under 35 U.S.C. §119 to U.S. Provisional Patent Application Ser. No. 61/377,782, filed on Aug. 27, 2010, which is hereby incorporated herein in its entirety.

TECHNICAL FIELD

The present invention generally relates to a boot process and a controller for implementing the boot process.

BACKGROUND

Once a typical computer receives power, the computer begins a boot process. Computers typically use a basic input/output system ("BIOS") to boot the computer. However, the boot processes in typical computer systems can take a significant amount of time, which may be undesirable in certain applications. In other applications the user of the computer simply may prefer a computer with quicker booting capabilities.

Accordingly, it is desirable to have a computer with a quicker booting time and a method for quickly booting a computer. Other desirable features and characteristics will become apparent from the subsequent detailed description of the invention and the appended claims, taken in conjunction with the accompanying drawings and this background.

BRIEF SUMMARY

A method of booting a computer, including a processor, a north bridge, a south bridge and a controller, is provided. The method may include transferring, by the controller, a boot image and from a non-volatile memory to a first volatile memory. The method may further include initializing, by the processor, a volatile memory interface between the processor and a second volatile memory. The method may further include transferring, by the controller, the boot image from the first volatile memory to the second volatile memory and booting the computer based upon the boot image stored in the second volatile memory.

A computer, including a processor, a north bridge communicatively connected to the processor, a south bridge communicatively connected to the north bridge and a controller communicatively connected to the processor, the north bridge and the south bridge is provided. The computer may further include a non-volatile memory communicatively connected to the controller, a first volatile memory communicatively connected to the controller, and a second volatile memory communicatively connected to the processor. The controller may be configured to simultaneously power sequence the processor, north bridge, south bridge and controller, transfer a boot image and from the non-volatile memory to the first volatile memory, and transfer the boot image from the first volatile memory to the second volatile memory.

A computer system is further provided. The computer system may include a processor, a chipset and a controller. The controller may be configured to boot the processor and chipset so the computer system is ready to spawn an application within one second of receiving power.

BRIEF DESCRIPTION OF THE DRAWINGS

The present invention will hereinafter be described in conjunction with the following figures.

FIG. 6 illustrates an exemplary timing diagram for power sequencing a processor during a boot process for a computer in accordance with an embodiment.

DETAILED DESCRIPTION OF THE DRAWINGS

The following detailed description of the drawings is merely exemplary in nature and is not intended to limit the embodiments or the application and uses of the embodiments. Furthermore, there is no intention to be bound by any theory presented in the preceding background or the following detailed description of the drawings.

Figure 1:
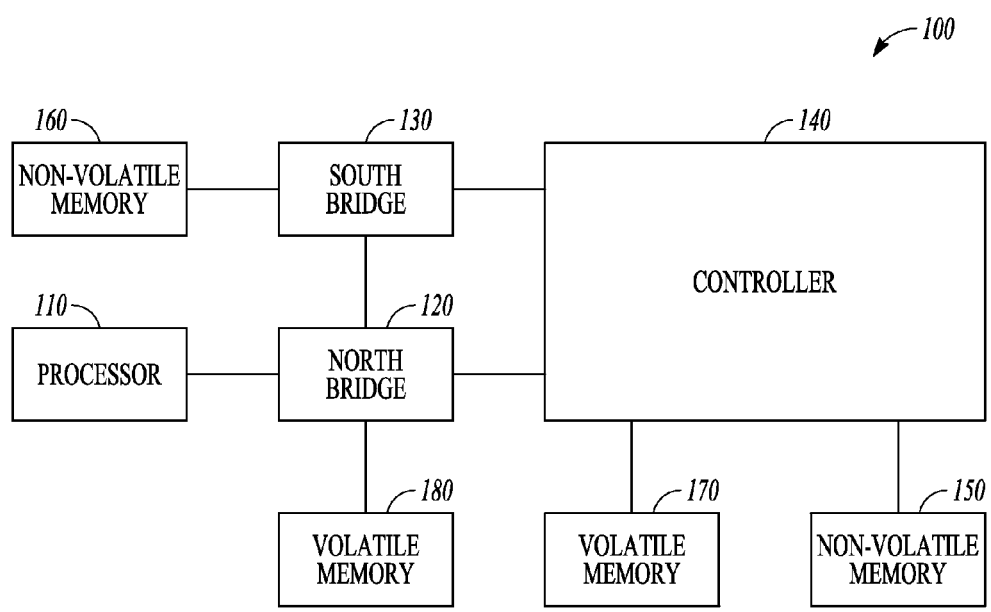
FIG. 1 illustrates an exemplary computer in accordance with an embodiment.

FIG. 1 illustrates an exemplary computer 100 in accordance with an embodiment. The computer 100 includes a processor 110, a north bridge 120, a south bridge 130 and a controller 140. The computer 100 further includes non-volatile memories 150 and 160 and volatile memories 170 and 180. The processor 110, north bridge 120 and south bridge 130 may be part of an Intel Core2 Duo computer system. However, other processor and chipset configurations may also take advantage of the booting process described herein.

The processor 110 may be a computer processing unit ("CPU"), a graphical processing unit ("GPU"), a complex programmable logic device ("CPLD"), a micro-controller, an application specific integrated circuit ("ASIC"), a field programmable gate array ("FPGA") or any other processor or configurable logic device.

The north bridge 120, also known as a memory controller hub ("MCH") or an integrated memory controller ("IMC") typically handles communications among processor 100, volatile memory, such as random access memory ("RAM'), a PCI Express ("PCI-E") or advanced graphics port ("AGP") interface, and the south bridge 130.

The south bridge 130, also known as an input/output ("I/O") controller hub, is a chip that implements the I/O capabilities of the motherboard in a north bridge/south bridge chipset computer architecture.

Separating the chipset into the north bridge 120 and south bridge 130 is common, although there are instances where the two chips have been combined onto one die when design complexity and fabrication processes permit it. Furthermore, in another embodiment, the processor 110, north bridge 120 and south bridge 130 may be integrated onto a single die.

The controller 140 is a configurable logic device. In one embodiment the controller 140 may be a field programmable gate array ("FPGA"). In other embodiments, the controller 140 may be a micro-controller, a complex programmable logic device ("CPLD"), an application specific integrated circuit ("ASIC") or other configurable logic device. In other embodiments multiple controllers 140 may be used. For example, separate controllers 140 may be used to handle a power sequencing of the computer during the booting process and to control a transfer of the boot image, as described in further detail below.

Non-volatile memories 150 and 160 may be flash memory devices; however, other non-volatile memories may be used. Non-volatile memory is memory that retains the information stored therein when power is removed from the memory. Volatile memory is typically quicker than non-volatile memory; however, volatile memory loses all of the data stored therein when the volatile memory loses power.

Volatile memories 170 and 180 may be, for example, random-access memory ("RAM"). RAM is generally embodied on integrated circuits that allow stored data to be accessed in any order (i.e., at random). "Random" refers to the idea that any piece of data can be returned in a constant time, regardless of its physical location and whether or not it is related to the previous piece of data.

In one embodiment, volatile memory 170 may be a staticRAM ("SRAM"). SRAM is a type of semiconductor memory where the word static indicates that, unlike dynamic RAM ("DRAM"), it does not need to be periodically refreshed, as SRAM uses bistable latching circuitry to store each bit. SRAM exhibits data remanence, but is still volatile in the conventional sense that data is eventually lost when the memory is not powered. The volatile memory 170 may be two 32-bit SRAM devices, integrated with controller 140 along a 64-bit memory bus. In another embodiment, the volatile memory 170 may be a 64-bit SRAM device. Other embodiments may use other types of memories, as desired.

In one embodiment the volatile memory 180 may be a synchronous dynamic RAM ("SDRAM"). SDRAM is a form of DRAM that has a synchronous interface. Traditionally, DRAM has an asynchronous interface, that responds relatively quickly to changes in control inputs. SDRAM generally waits for a clock signal before responding to control inputs and is therefore synchronized with the computer's system bus.

An exemplary method for booting the computer 100 is described below in conjunction with FIG. 2

Figure 2:
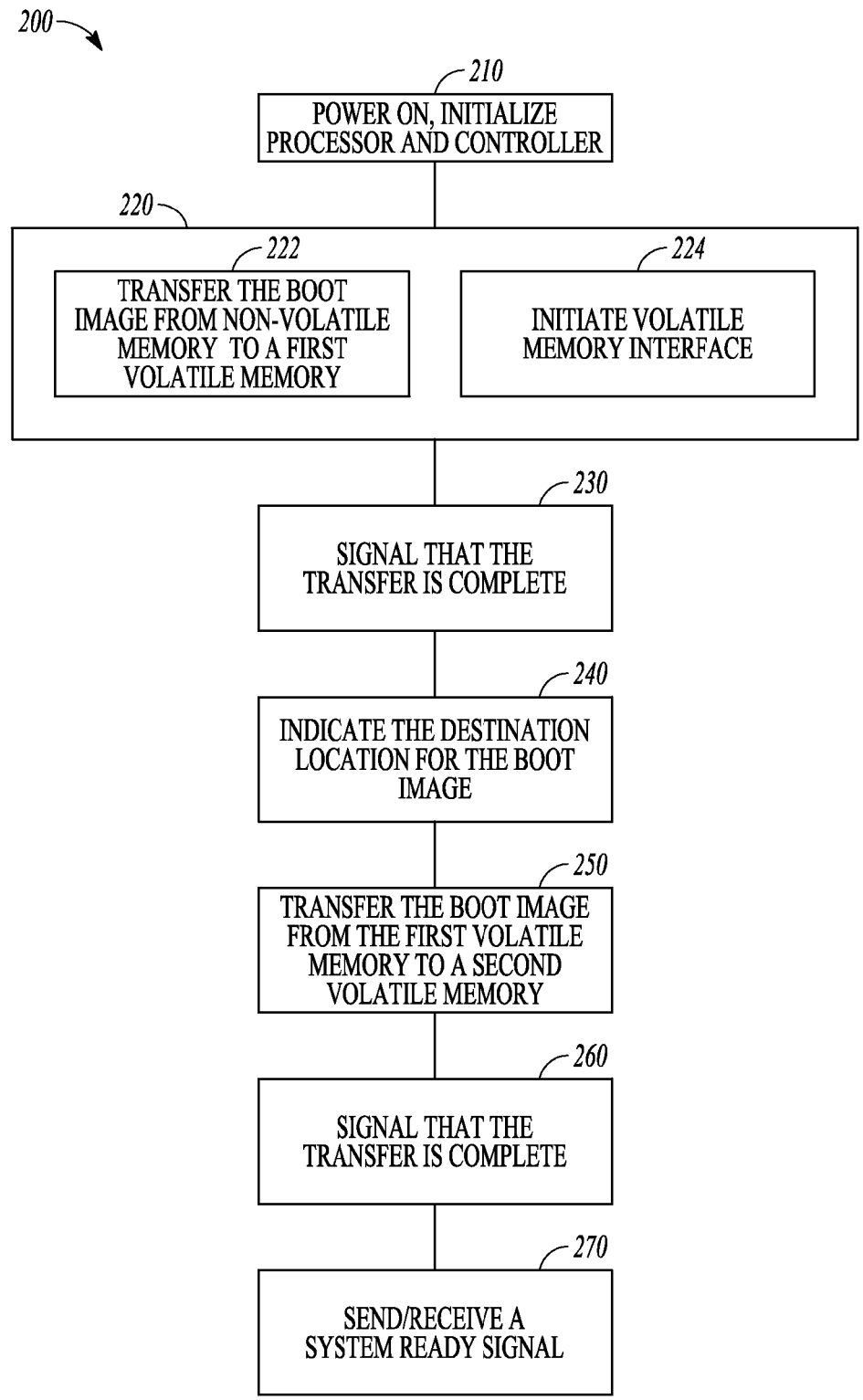
FIG. 2 illustrates an exemplary boot process for a computer in accordance with an embodiment.

FIG. 2 illustrates an exemplary method 200 for booting a computer in accordance with one embodiment. Once power is applied to the computer 100, the processor 110 and controller 140 go through their respective power sequencing and configuration. (Step 210). After the controller 140 and processor 110 are finished with their respective power sequencings and configurations, each begins a first phase of the booting process. (Step 220). After the controller 140 is configured, the controller initiates a transfer of a boot image from non-volatile memory 150 to volatile memory 170. (Step 222). Simultaneously, the processor fetches instructions from the non-volatile memory 160 to initialize a volatile memory interface between the north bridge 120 and volatile memory 180. (Step 224). The processor, during step 224, may also configure a PCI-express link to allow data to be transferred via a PCI-Expresses bus between the non-volatile memory 170 and the non-volatile memory 180. The boot image transfer generally takes longer then the volatile memory interface initialization, so the controller 140 sends a discrete signal, such as an interrupt, or an update to a status register to indicate that the transfer is complete. (Step 230). The processor 110 then signals the controller 140 and indicates the location in volatile memory 180 that will receive the boot image. (Step 240). In some embodiments the processor may also indicate the size of the image to be transferred. The controller 140 then autonomously transfers the boot image via a PCI-Express port from volatile memory 170 to volatile memory 180 via direct memory accesses ("DMA"). (Step 250). The PCI-Express port may, for example, be a PCI-Express graphics port. After the transfer is complete, the processor uses a discrete signal, such as an interrupt or an update to a register in the controller 140, to indicate the transfer is complete. (Step 260). The processor then processes the boot image to boot the computer, and then indicates that the system is ready. (Step 270). In another embodiment, the controller may issue a signal that the system is ready. After the system is ready, the computer is capable of, for example, spawning and executing an application.

In another embodiment, the controller may also transfer an application image in addition to the boot image (Steps 210-250), so that the application is ready to be executed as soon as the system is ready at step 270.

One benefit of certain embodiments is that the power sequencing and booting process can be completed relatively quickly, e.g. in less than 300 milliseconds or so. In comparison, the total power sequencing and preparation to boot the operating system in a typical computer system using the Intel Core2 Duo chipset takes more than 5 seconds. Other embodiments may exhibit other performance parameters.

Figure 3:
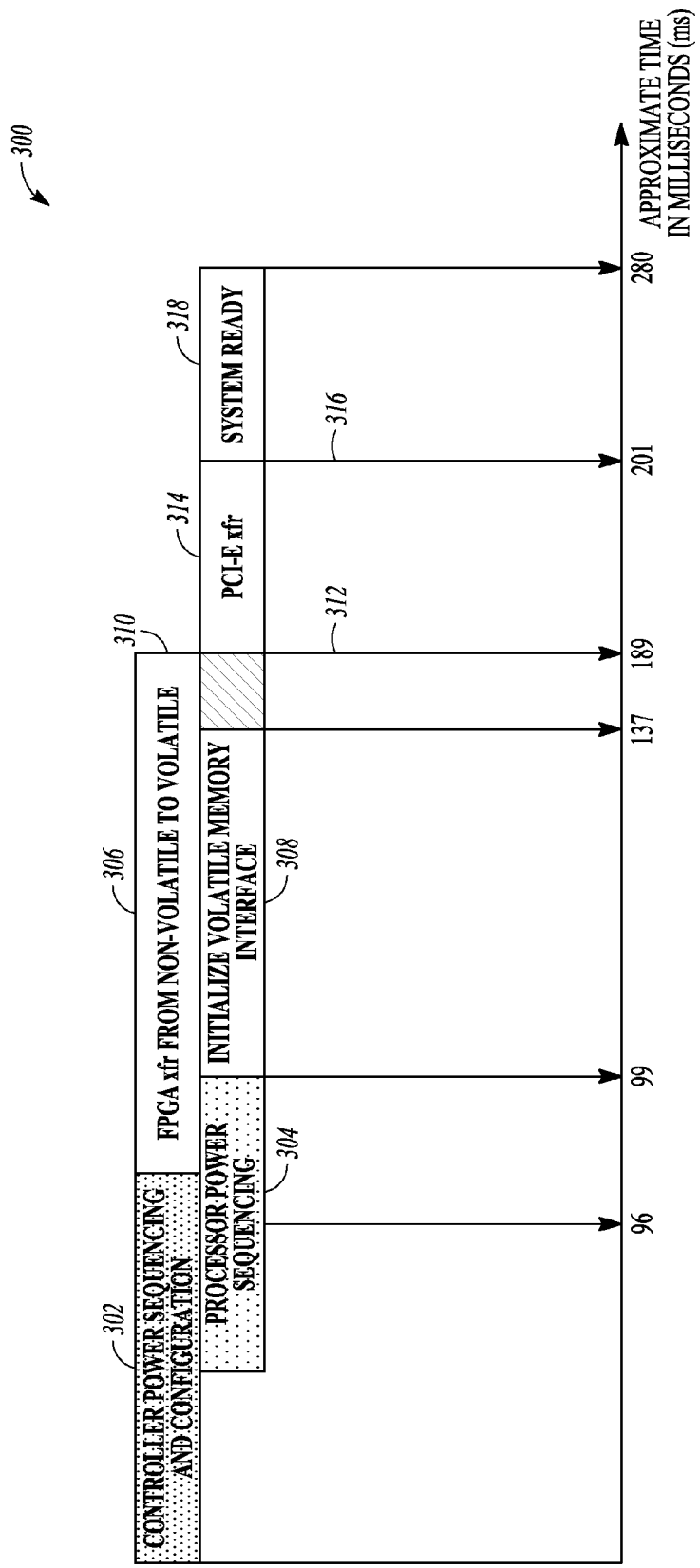
FIG. 3 illustrates an exemplary timing diagram for a boot process for a computer in accordance with an embodiment.

FIG. 3 illustrates an exemplary timing diagram 300 of a computer system 100 using a booting process in accordance with one embodiment. While the timing discussed herein is consistent with actual measured times, the timing may vary and is not intended to set or limit the time for any of the phases discussed herein. Further, it should be noted that FIG. 3 is not drawn to scale.

The controller 140 and processor 110, after the computer first receives power, simultaneously enter into a power sequencing and configuration mode, as described in further detail below. (Steps 302 and 304). As seen in FIG. 3, the controller's 140 power sequencing and configuration can be completed in approximately 96 milliseconds and the processor's 110 power sequencing and configuration can be completed in approximately 99 milliseconds. After the controller 140 has been configured in step 302, the controller 140 begins transferring a boot image and, in some embodiments, the application image from a non-volatile memory 150 to a volatile memory 170. (Step 306). The time to complete the transfer will depend upon the size of the boot image and the application image. However, in most cases the transfer will take less than 115 milliseconds and may take less than 88 milliseconds in some embodiments. The boot image and the application image are transferred from the non-volatile memory 150 to the volatile memory 170 because the volatile memory 170 is much faster. Accordingly, when the images are transferred from the volatile memory 170 connected to the controller to the processor's volatile memory 180 via the PCI-E bus, the transfer can be completed quicker.

After the processor 110 finishes its respective power sequencing in step 304, the processor 110 initializes a volatile memory interface between the processor 110, a north bridge 120 and the processor's volatile memory 180. (Step 308). As discussed above, the processor may also configure the PCI-e link while initializing the volatile memory interface.

After the controller 140 has completed the transfer in step 306, the controller 140 issues a discrete signal, such as an interrupt, or updates a status register to indicate that the transfer is complete. (Step 310). Once the processor 110 receives the discrete signal or detects the status register update, the processor 110 will then signal the controller 140 and indicate the location in volatile memory 180 that the boot image will be transferred to. (Step 312). Steps 310 and 312 take a nominal amount of time, and thus are not reflected on the timing diagram 300.

As discussed above, the controller 140 will then initiate a DMA via the PCI-e interface to transfer the boot image from a first volatile memory 170 to a second volatile memory 180 accessible by the processor. (Step 314). The transfer will depend upon the size of the boot image and whether an application image is transferred at the same time, however, the transfer in step 314 will normally take less than 20 milliseconds and can take 12 milliseconds or less in some embodiments. Once the transfer is complete, the controller 140 once again signals the processor 110 via a discrete signal or by updating a status register. (Step 316). As with steps 312 and 314, step 316 takes a nominal amount of time, and is thus not reflected on the timing diagram 300. The processor 110 then processes the boot image, completes the boot of the computer, and prepares for an application spawn, which in some embodiments, may take 80 milliseconds or less. (Step 318).

Accordingly, as seen in FIG. 3, the booting process for the computer system 100 may be completed in 300 milliseconds or less in this example. This reflects a significant improvement over the typical 5 second booting process.

Figure 4:
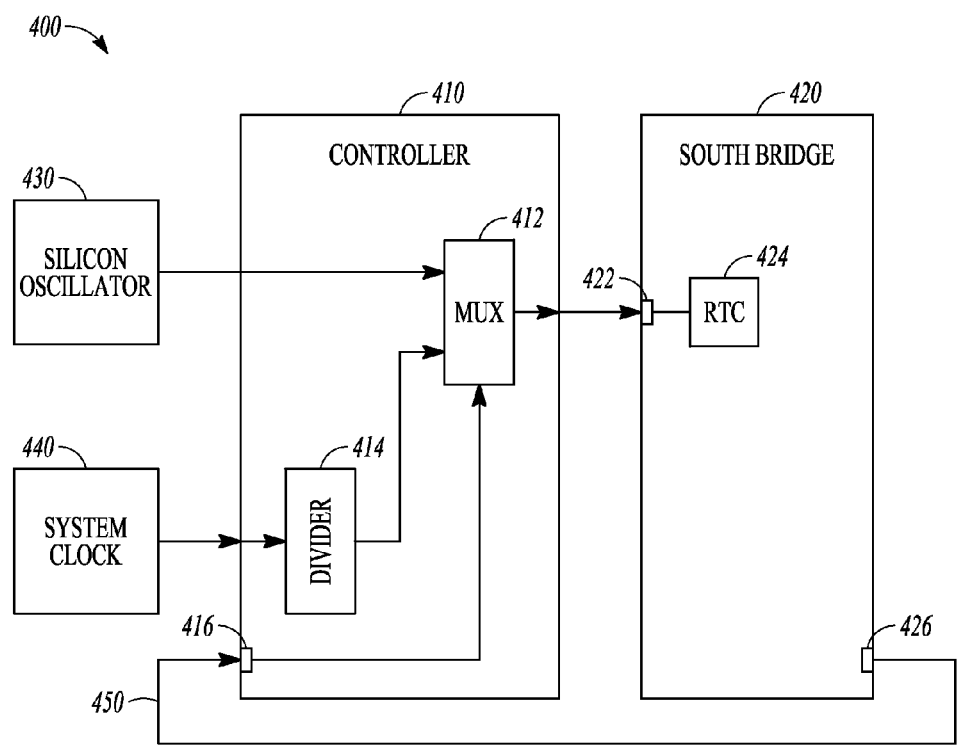
FIG. 4 illustrates another exemplary computer in accordance with an embodiment.

A power sequencing method for a computer 400 will be described in FIGS. 4-6. FIG. 4 illustrates another exemplary computer 400. The computer 400 includes a controller 410, a south bridge 420, a silicon oscillator 430, and a system clock 440. The controller 410 further includes a multiplexor ("MUX") 412 and may further include a divider 414. The controller 410 is configured to control a power sequencing of the computer 400.

The south bridge 420 includes a real time clock ("RTC") 422 and a RTC input pin 424. The south bridge 420 controls the RTC based upon an input oscillating signal received at the RTC input pin. The south bridge 420 also has an output pin 426, which outputs a predetermined signal 450 after a predetermined point in the power sequencing of the south bridge 420. The output pin 426 is communicatively connected to an input pin 416 of the controller 410. The predetermined signal 450 may indicate, for example, that the south bridge has completed power management resets.

The controller 410 is configured to receive respective oscillating signals from the silicon oscillator 430 and system clock 440 and directs the respective oscillating signals to the MUX 412. The MUX 412 is selectively controlled to output one of the respective oscillating signals based upon the signal output from the south bridge. The controller 410 is thus configured to output one of the oscillating signals from either the silicon oscillator 430 or the system clock 440 to the RTC input pin of the south bridge 420.

In one embodiment the silicon oscillator 430 may output an oscillating frequency of 32.768 KHz and the system clock 440 may output an oscillating frequency of 100 KHz. In another embodiment, the system clock 440 may output an oscillating frequency of 100 MHz. In this embodiment, the controller may further include a divider 414. The divider 414 receives the oscillating signal from the system clock and output a divided signal. For example, if the system clock is outputting an oscillating frequency of 100 MHz, the divider may be configured to divide the signal by 1000, thereby outputting a 100 KHz signal.

The RTC of the south bridge 420 may be configured to expect a 32.768 KHz input signal as the basis for the RTC. In accordance with the embodiments discussed herein, the controller is configured to provide a faster oscillating signal until a predetermined point in the power sequencing of the south bridge 440. For example, the controller may output the 100 KHz signal based upon the system clock 440. Since the RTC of the south bridge 420 assumes that the input is oscillating at 32.768 KHz, and the south bridge merely counts a predetermined number of edges of the RTC input signal during the wait period, by applying an input signal at a faster frequency, the south bridge will pass through the wait period at an accelerated rate. Accordingly, one benefit of the embodiments discussed herein is that the wait time required by the PCI 2.3 and PCIe 1.1 specifications can be reduced by 66% or more, thereby reducing the overall boot time of the computer system 400. The wait time may be adjusted depending upon what is actually required by the computer system 400.

Figure 5:
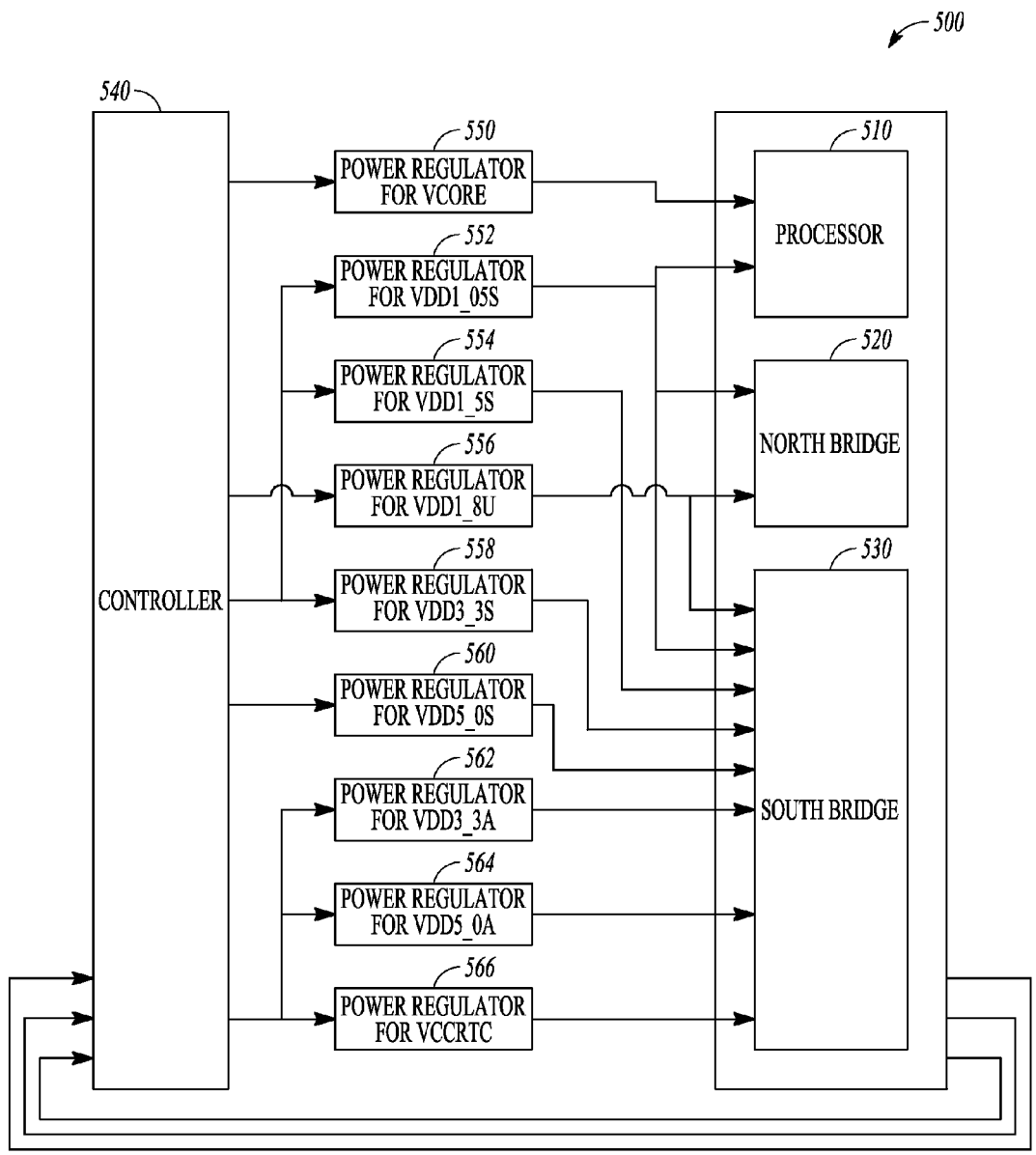
FIG. 5 illustrates yet another exemplary computer in accordance with an embodiment.

FIG. 5 illustrates yet another computer 500 in accordance with an embodiment. The computer includes a processor 510, a north bridge 520, a south bridge 530 and a controller 540. The computer further includes nine power regulators, regulators 550-566. Each of the power regulators 550-566 may receive a higher input voltage and output a lower voltage than may be expected by the processor 510, north bridge 520 and south bridge 530. As discussed above, the controller 540 controls the power sequencing for the processor 510, north bridge 520 and a south bridge 530. The operation of the embodiment illustrated in FIG. 5 will be discussed in conjunction with FIG. 6

FIG. 6 illustrates an exemplary timing diagram for a power sequencing operation during boot up of the computer system 500. It should be noted that FIG. 6 is not drawn to scale.

Computer systems typically have a specified start-up power sequencing that is defined by the manufacturer. Processor 510, north bridge 520 and south bridge 530 may each have multiple power input pins, each of which must be powered in the correct sequence. For example, a computer system 500 using a processor 510 and a corresponding Intel Core2 Duo chipset may have a total of 12 different power input pins and nine sequential steps in the power sequencing. The manufacturer of the processor and chipset typically provide a power sequencing sequence which maximizes the chance that the computer will successfully power-up. However, the sequence provided by the manufacturer may not be the fastest or the most efficient. For example, the PCI 2.3 and PCIe 1.1 specifications both call for a 100 millisecond wait time to guarantee a minimum time between the computer system receiving a valid, stable power signal and a reset deassertion, after which the computer system continues with a power sequencing process. One benefit of the embodiments discussed herein is that the wait time is significantly reduced, therefore reducing the overall boot time of the computer system 500. Furthermore, the embodiments discussed execute several of the power sequencing steps simultaneously, thereby further reducing the boot time of the computer 500, as described in further detail below.

The power sequencing by controller 540 begins by powering regulators 562, 564 and 568 for VDD3_3A, VDD5_0A and VCCRTC, respectively as seen in FIG. 6. Prior systems powered each of these regulators sequentially. However, it was discovered that regulators 562, 564 and 568 could be applied simultaneously without suffering from any boot timeline penalties or any errors. The controller then proceeds to wait as prescribed by the PCI 2.3 and PCIe 1.1 specifications. However, as discussed above, the controller 540 issues a faster than expected oscillating signal to the RTC pin of the south bridge 530 during the wait period as seen in FIG. 6. Accordingly, in one embodiment, the wait period may last 34 milliseconds instead of the prescribed 100 milliseconds. The wait period may be increased or decreased depending upon the needs of the computer system.

After the wait period, the controller applies power to regulator 556 for VDD1_8U. The controller 540 then simultaneously applies power to regulators 552, 554, 558 and 560 for VDD1_05S, VDD1_5S, VDD3_3S an VDD5_0S, respectively. Finally, as seen in FIG. 6, the controller applies power to regulator 550 for VCORE. As seen in FIG. 6, the power sequencing for processor 510, north bridge 520 and a south bridge 530 can be accomplished in 88 milliseconds or less. Furthermore, the power sequencing of the controller and the time required to start up and stabilize the system clock and silicon oscillator may add as little as 9 milliseconds to the power sequencing process. Accordingly, in one embodiment, the entire power sequencing for the computer 500 may be accomplished in 97 milliseconds. Other embodiments may exhibit different power sequencing times or other operation parameters.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of booting a computer, including a processor and a controller, comprising:
   transferring, by the controller, a boot image from a non-volatile memory to a first volatile memory, the first volatile memory comprising a static random access memory (SRAM);
   initializing, by the processor, a volatile memory interface between the processor and a second volatile memory, the second volatile memory comprising a synchronous dynamic random access memory (SDRAM);
   transferring, by the controller, the boot image from the first volatile memory to the second volatile memory; and
   booting the computer based upon the boot image stored in the second volatile memory.

2. The method of claim 1, wherein the transferring by the controller, the boot image from the first volatile memory to the second volatile memory, uses a PCI express interface.

3. The method of claim 1, comprising simultaneously power sequencing the controller and the processor.

4. The method of claim 1, wherein the controller and the processor simultaneously perform the transferring of the boot image from the non-volatile memory to the first volatile memory and the initializing.

5. The method of claim 1, wherein the booting is completed in less than or equal to 300 milliseconds.

6. The method of claim 1, comprising:
   transferring, by the controller, an application image and from the non-volatile memory to the first volatile memory; and
   transferring, by the controller, the application image and from the first volatile memory to the second volatile memory.

7. The method of claim 6, further comprising executing, after the application image is transferred from the first volatile memory to the second volatile memory, the application.

8. A computer, comprising:
   a processor;
   a controller communicatively connected to the processor;
   a non-volatile memory communicatively connected to the controller;
   a first volatile memory communicatively connected to the controller, the first volatile memory comprising a static random access memory (SRAM); and
   a second volatile memory communicatively connected to the processor, the second volatile memory comprising a synchronous dynamic random access memory (SDRAM),
   wherein the controller is configured to:
      simultaneously power sequence the processor and controller,
      transfer a boot image from the non-volatile memory to the first volatile memory, and
      transfer the boot image from the first volatile memory to the second volatile memory.

9. The computer of claim 8, wherein the processor is configured to boot the computer based upon the image transferred to the second volatile memory.

10. The computer of claim 9, wherein the processor is further configured to initialize, before the controller transfers the boot image from the first volatile memory to the second volatile memory, a volatile memory interface between the processor and the second volatile memory.

11. The computer of claim 8, wherein the computer is configured to be booted and ready to spawn an application within 300 milliseconds of receiving power.

12. The computer of claim 8, wherein the controller is further configured to transfer the boot image from the first volatile memory to the second volatile memory using a PCI express interface.

13. The computer of claim 8, wherein the controller is further configured to:
   transfer an application image and from the non-volatile memory to the first volatile memory, and
   transfer the application image from the first volatile memory to the second volatile memory.

14. The computer of claim 13, wherein the processor is configured to spawn an application based upon the application image transferred into the second volatile memory.

15. The computer of claim 14, wherein the computer is configured to be booted and ready to spawn an application within 300 milliseconds of receiving power.

* * * * *